United States Patent
Imamura et al.

(10) Patent No.: US 8,221,925 B2
(45) Date of Patent: Jul. 17, 2012

(54) FUEL CELL SYSTEM FOR IMPEDANCE MEASUREMENT AND SCAVENGING PROCESSING

(75) Inventors: Tomonori Imamura, Nagoya (JP); Shigeto Kajiwara, Okazaki (JP); Shinji Aso, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 433 days.

(21) Appl. No.: 12/521,523

(22) PCT Filed: Dec. 5, 2007

(86) PCT No.: PCT/JP2007/073894
§ 371 (c)(1),
(2), (4) Date: Jul. 22, 2009

(87) PCT Pub. No.: WO2008/078554
PCT Pub. Date: Jul. 3, 2008

(65) Prior Publication Data
US 2010/0323260 A1     Dec. 23, 2010

(30) Foreign Application Priority Data
Dec. 27, 2006   (JP) .................................. 2006-351476

(51) Int. Cl.
*H01M 8/04* (2006.01)
(52) U.S. Cl. .......................... 429/430; 429/428; 429/429
(58) Field of Classification Search .......................... None
See application file for complete search history.

(56) References Cited

U.S. PATENT DOCUMENTS

| 2003/0180583 A1* | 9/2003 | Ichikawa et al. ................. 429/9 |
| 2006/0115699 A1* | 6/2006 | Matsuoka ....................... 429/24 |

FOREIGN PATENT DOCUMENTS

| JP | 07-235324 | * | 9/1995 |
| JP | 7-235324 A | | 9/1995 |
| JP | 2002-246053 A | | 8/2002 |
| JP | 2003-86220 A | | 3/2003 |
| JP | 2003-297399 A | | 10/2003 |
| JP | 2004-179086 A | | 6/2004 |
| JP | 2004-199988 A | | 7/2004 |
| JP | 2004-207139 A | | 7/2004 |
| JP | 2005-141943 A | | 6/2005 |
| JP | 2005-209610 A | | 8/2005 |
| JP | 2005-209634 A | | 8/2005 |
| JP | 2005-209635 A | | 8/2005 |
| JP | 2006-107901 A | | 4/2006 |
| JP | 2007-149572 A | | 6/2007 |

* cited by examiner

*Primary Examiner* — Ula C Ruddock
*Assistant Examiner* — Tony Chuo
(74) *Attorney, Agent, or Firm* — Kenyon & Kenyon LLP

(57) ABSTRACT

A fuel cell system capable of adequately controlling the water content of a fuel cell is provided. An impedance reference value is stored in a memory for an impedance comparator. The impedance reference value is a reference value that is set in order to prevent the water content in a fuel cell from decreasing too much. The impedance comparator compares a measured impedance value supplied from an impedance operation unit with the impedance reference value and performs scavenging control based on the comparison result.

4 Claims, 7 Drawing Sheets

FUEL CELL SYSTEM FOR IMPEDANCE MEASUREMENT AND SCAVENGING PROCESSING

This is a 371 national phase application of PCT/JP 2007/073894 filed 5 Dec. 2007, which claims priority to Japanese Patent Application No. 2006-351476 filed 27 Dec. 2006, the contents of which are incorporated herein by reference.

TECHNICAL FIELD

The present invention generally relates to a fuel cell system for impedance measurement.

BACKGROUND ART

A fuel cell system has a problem of possible damage that may be caused to pipes and valves when the external temperature is low and water generated inside the fuel cell system becomes frozen after the fuel cell system is stopped. In general, a fuel cell is more difficult to activate than other power sources; and particularly under low temperature, the fuel cell has a problem of inability to supply a desired voltage/current, thereby failing to activate the relevant equipment.

In light of the above-described problem, a method for discharging moisture accumulated inside the fuel cell by executing scavenging processing when the fuel cell system is stopped has been suggested (see, for example, Patent Document 1).

[Patent Document 1] Japanese Patent Application Laid-Open (Kokai) Publication No. 2005-141943

DISCLOSURE OF THE INVENTION

However, if scavenging processing is executed every time a fuel cell system is stopped, the scavenging processing may also take place when it is not required, which results in a problem of excessive drying of a fuel cell more than necessary, which thereby makes it more difficult to activate the fuel cell system.

The present invention was devised in light of the circumstances described above, and it is an object of the invention to provide a fuel cell system capable of adequately controlling the water content in a fuel cell.

In order to solve the aforementioned problem, a fuel cell system according to the present invention is characterized in that it includes: measurement means for measuring an impedance value of a fuel cell; memory means for storing an impedance reference value; judgment means for judging, based on the result of comparison of the impedance value measured by the measurement means with the impedance reference value, whether scavenging processing should be executed or not; and execution means for executing the scavenging processing if an affirmative judgment is returned.

In the above-described configuration, the scavenging processing is executed only when it is determined based on the result of comparison of the measured impedance value with the impedance reference value that the scavenging processing should be executed. As a result, it is possible to prevent any adverse effects caused by unnecessary execution of the scavenging processing, i.e., the problem of, for example, excessively drying an electrolyte membrane, thereby making it more difficult to activate the fuel cell system due to the unnecessary execution of the scavenging processing.

In the above-described configuration, it is preferable that if the measured impedance value is lower than the impedance reference value, the judgment means determines that the scavenging processing should be executed.

Moreover, the fuel cell system in the above-described configuration should preferably further include storage means for storing, if the measured impedance value is lower than the impedance reference value, the measured impedance value and elapsed time after the start of the scavenging processing by associating them with each other; and calculation means for calculating time that is required for the measured impedance value to reach the impedance reference value, based on the measured impedance value, the elapsed time after the start of the scavenging processing, and the impedance reference value.

Also, the fuel cell system according to the present invention should preferably be a fuel cell system for measuring an impedance value of a fuel cell and performing scavenging control based on the measurement result, the fuel cell system including: measurement means for measuring the impedance value of the fuel cell and elapsed time after the start of scavenging processing more than once; storage means for storing a plurality of pairs of the measured impedance value and the elapsed time; memory means for storing an impedance reference value; and estimation means for estimating scavenging completion time based on the impedance reference value and the pairs of the measured impedance value and the elapsed time.

In the above-described configuration, it is preferable that the measurement means performs the measurement twice, the first measurement around the time of the start of the scavenging processing and the second measurement after specified time has elapsed from the start of the scavenging processing.

Moreover, the fuel cell system in the above-described configuration should preferably further include a temperature sensor for detecting a temperature relating to the fuel cell; and change means for changing the impedance reference value based on the detected temperature.

Furthermore, the fuel cell system in the above-described configuration should preferably further include a calendar mechanism for detecting a date and time; and change means for changing the impedance reference value based on the detected date and time.

As described above, the present invention makes it possible to adequately control the water content in the fuel cell.

BEST MODE FOR CARRYING OUT THE INVENTION

Embodiments of the present invention will be explained below with reference to the attached drawings.

A. First Embodiment
Overall Configuration

Figure 1:
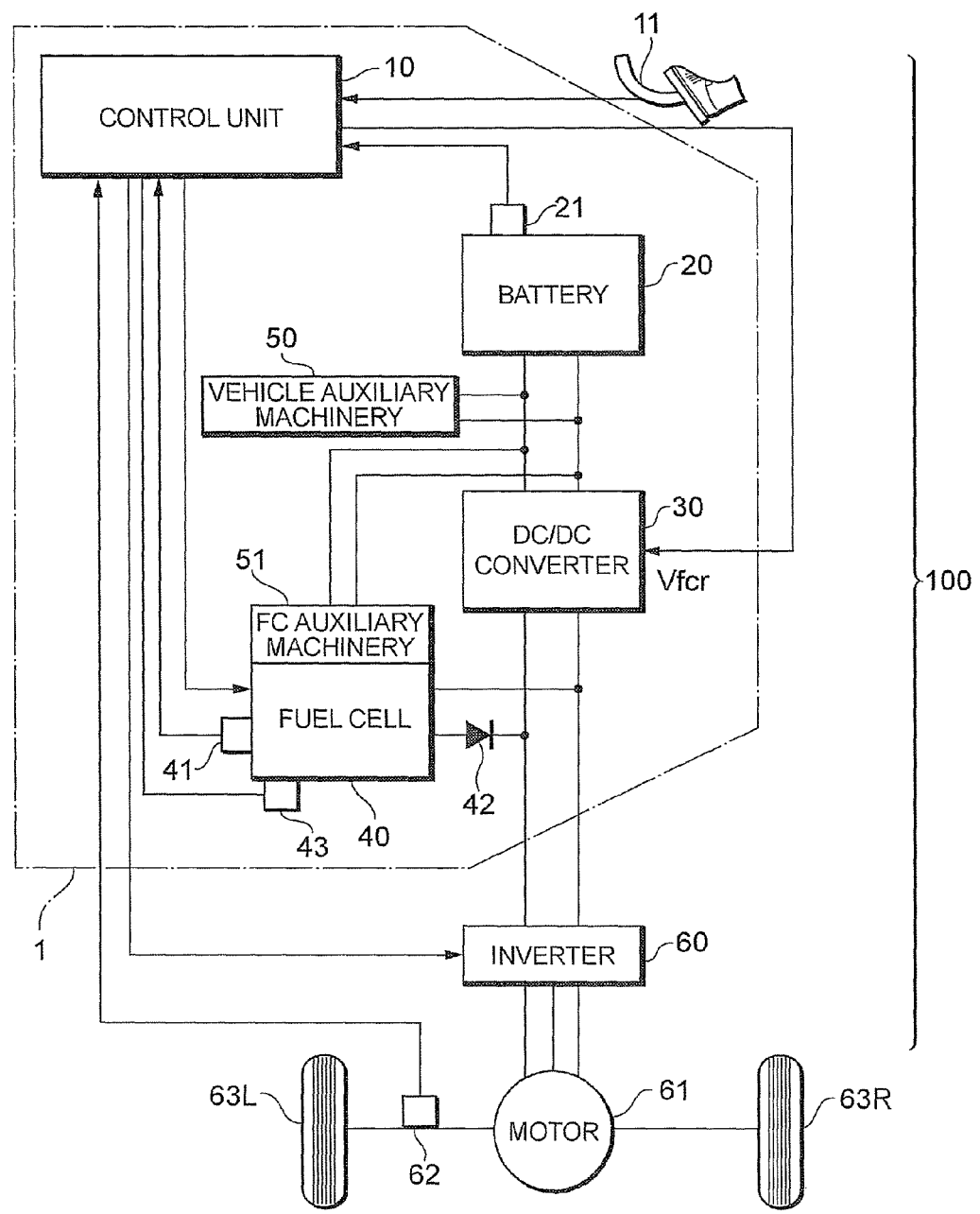
FIG. 1 shows the configuration of a fuel cell system according to the first embodiment.

FIG. 1 shows the schematic configuration of a vehicle on which a fuel cell system 100 according to the first embodiment is mounted. Incidentally, a fuel cell powered vehicle (FCHV: Fuel Cell Hybrid Vehicle) is assumed as an example of this vehicle in the following explanation, but the fuel cell system 100 can be used for both electric vehicles and hybrid vehicles. The fuel cell system 100 can be used not only for vehicles, but also various kinds of moving bodies (such as ships, airplanes, and robots).

This vehicle runs using a synchronous motor 61 connected to wheels 63L, 63R as a driving force source. A power supply system 1 provides a power source for the synchronous motor 61: A direct current output from the power supply system 1 is converted by an inverter 60 to a three-phase alternating current, which is then supplied to the synchronous motor 61. The synchronous motor 61 can also serve as an electric generator at the time of braking.

The power supply system 1 is constituted from, for example, a fuel cell 40, a battery 20, and a DC/DC converter 30. The fuel cell 40 is a means for generating electric power from supplied fuel gas and oxidant gas and has a stack configuration in which a plurality of fuel cells including MEAs are stacked in series. Specifically speaking, various types of fuel cells such as solid polymer fuel cells, phosphoric-acid fuel cells, and molten carbonate fuel cells can be used.

The battery 20 is a secondary battery capable of charge and discharge and is composed of, for example, a nickel hydrogen battery. Various other types of secondary batteries can be used. Also, a condenser capable of charge and discharge other than the secondary battery, for example, a capacitor may be used instead of the battery 20. This battery 20 is inserted into a discharge path of the fuel cell 40 and is connected in parallel to the fuel cell 40.

The fuel cell 40 and the battery 20 are connected in parallel to the inverter 60, and a diode 42 for preventing the reverse flow of a current from the battery 20 or a current generated by the synchronous motor 61 is provided in a circuit from the fuel cell 40 to the inverter 60.

As described above, it is necessary to control a relative voltage difference between the two power sources, the fuel cell 40 and the battery 20 which are connected in parallel, in order to realize appropriate output distribution between the fuel cell 40 and the battery 20. A DC/DC converter 30 is placed between the battery 20 and the inverter 60 in order to control the voltage difference. The DC/DC converter 30 is a direct-current voltage converter and has a function adjusting a DC voltage input from the battery 20 and outputting the adjusted DC voltage to the fuel cell 40 and a function adjusting a DC voltage input from the fuel cell 40 or the motor 61 and outputting the adjusted DC voltage to the battery 20.

Vehicle auxiliary machinery 50 and FC auxiliary machinery 51 are connected between the battery 20 and the DC/DC converter 30, and the battery 20 serves as a power source for the above-mentioned auxiliary machinery. The vehicle auxiliary machinery 50 includes various types of power equipment used, for example, when driving the vehicle, and includes lighting equipment, air-conditioning equipment, and oil hydraulic pumps. The FC auxiliary machinery 51 includes various types of power equipment used to operate the fuel cell 40, and includes pumps for supplying the fuel gas and reformed materials and a heater for adjusting the temperature of a reformer.

The operation of each of the above-mentioned components is controlled by a control unit 10. The control unit 10 is configured as a microcomputer containing a CPU, RAM, and ROM. The control unit 10 controls switching of the inverter 60 and outputs a three-phase alternating current to the synchronous motor 61 in accordance with the power requested. The control unit 10 also controls the operation of the fuel cell 40 and the DC/DC converter 30 in order to supply electric power in accordance with the power requested. Various sensor signals are input to this control unit 10. Sensors such as an accelerator pedal sensor 11, an SOC sensor 21 for detecting the State of Charge (SOC) of the battery 20, a flow rate sensor 41 for detecting the gas flow rate of the fuel cell 40, a temperature sensor 43 for detecting the internal temperature (FC temperature) of the fuel cell 40, and a vehicle speed sensor 62 for detecting the speed of the vehicle input various sensor signals to the control unit 10. The control unit 10 measures an impedance value of the fuel cell 40 as described below using each sensor signal and performs scavenging control based on the measurement result.

Explanation of Scavenging Control Function

Figure 2:
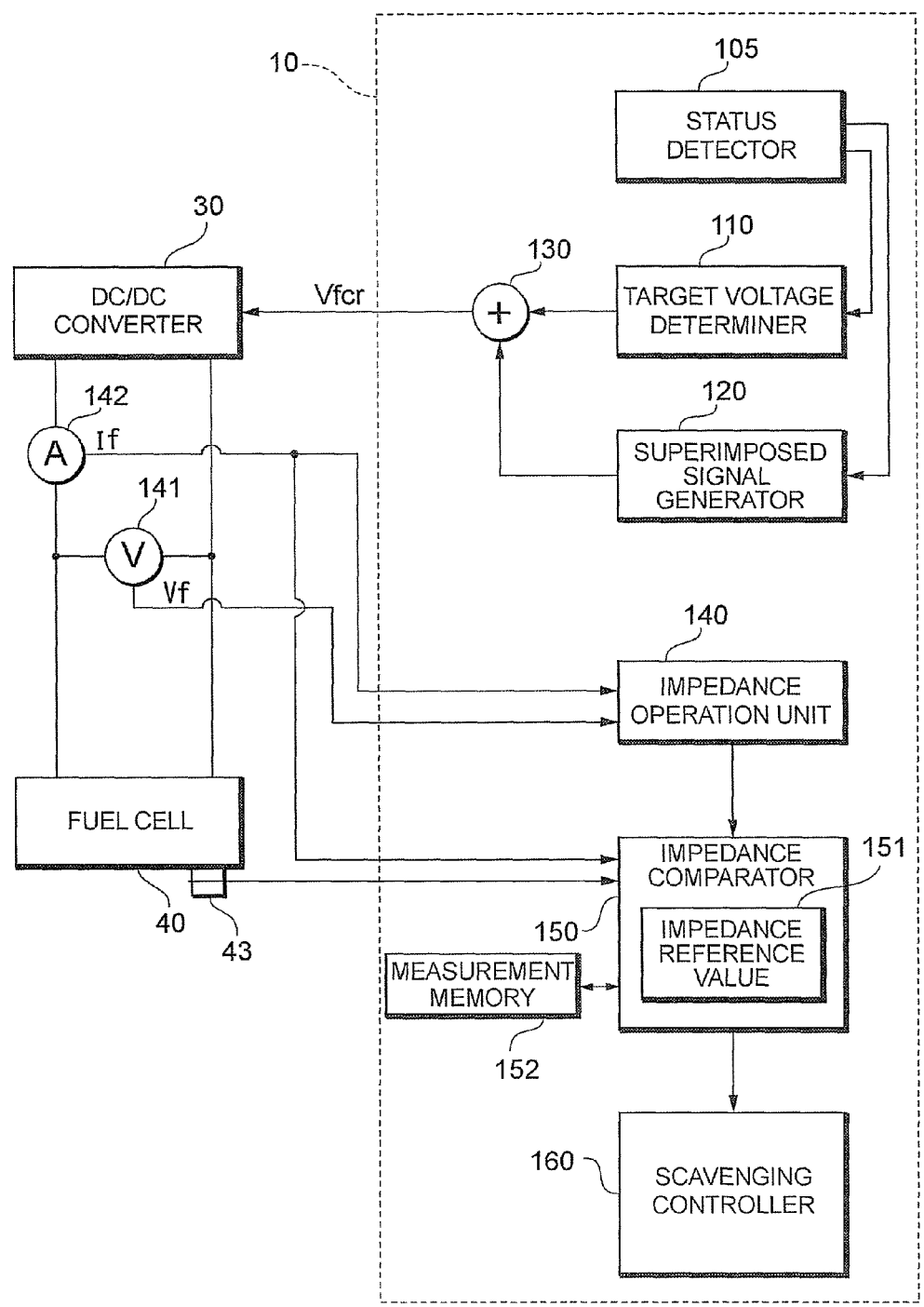
FIG. 2 is a diagram for explaining the function of a control unit according to the first embodiment.

FIG. 2 is a diagram for explaining a scavenging control function of the control unit 10.

As shown in FIG. 2, the control unit 10 includes a status detector 105, a target voltage determiner 110, a superimposed signal generator 120, a voltage command signal generator 130, an impedance operation unit 140, an impedance comparator 150, and a scavenging controller 160.

The status detector 105 detects whether the fuel cell 40 is in an electric-power-generating state or in a non-electric-power-generating state, based on, for example, the voltage (FC voltage) Vf of the fuel cell detected by a voltage sensor 141 and a current (FC current) If of the fuel cell 40 detected by a current sensor 142. The status detector 105 outputs the detection result to the target voltage determiner 110 and the superimposed signal generator 120.

The target voltage determiner 110 determines an output target voltage (for example, 300 V) based on the respective sensor signals input from, for example, the accelerator pedal sensor 11 and the SOC sensor 21 and then outputs the output target voltage to the voltage command signal generator 130.

The superimposed signal generator 120 generates an impedance measurement signal (such as a sine curve in a low frequency range with an amplitude value being 2 V) to be superimposed on the output target voltage and then outputs the impedance measurement signal to the voltage command signal generator 130. The respective parameters (the wave type, frequency, and amplitude value) for the output target voltage and the impedance measurement signal may be set as appropriate according to the system design.

The voltage command signal generator 130 superimposes the impedance measurement signal on the output target voltage and then outputs the obtained voltage command signal Vfcr to the DC/DC converter 30. The DC/DC converter 30 controls the voltage of, for example, the fuel cell 40 based on the supplied voltage command signal Vfcr.

The impedance operation unit (measurement means) 140 samples the voltage (FC voltage) Vf of the fuel cell 40 detected by the voltage sensor 141 and the current (FC current) If of the fuel cell 40 detected by the current sensor 142 at a specified sampling rate and executes, for example, Fourier transformation processing (FFT processing and DFT processing). The impedance operation unit 140 obtains an impedance value of the fuel cell 40 by, for example, dividing an FC voltage signal after the Fourier transformation processing by an FC current signal after the Fourier transformation processing, and then outputs the obtained impedance value to the impedance comparator 150.

After receiving the impedance value of the fuel cell 40 (hereinafter referred to as the "measured impedance value")

from the impedance operation unit 140, the impedance comparator (judgment means) 150 refers to an impedance reference value (scavenging completion target impedance) stored in the memory (memory means) 151. The impedance reference value is a reference value that is set to avoid excessive decrease of the water content in the fuel cell 40 (that is, excessive drying of an electrolyte membrane) and is determined in advance by, for example, experiments. This impedance reference value may be an always-constant value regardless of the FC temperature, or different impedance reference values may be set for different FC temperatures T.

After receiving the measured impedance value from the impedance operation unit 140, the impedance comparator 150 determines the impedance reference value at the FC temperature T detected by the temperature sensor 43. The impedance comparator 150 compares the determined impedance reference value with the measured impedance value and judges whether the measured impedance value is lower than the impedance reference value or not. If the measured impedance value is lower than the impedance reference value, the impedance comparator 150 stores, for example, the measured impedance value in the measurement memory (storage means) 152 and also notifies the scavenging controller 160 that the scavenging processing should continue (or should be started). On the other hand, if the measured impedance value is higher than the impedance reference value, the impedance comparator 150 notifies the scavenging controller 160 that the scavenging processing should be terminated (or should not be executed to start with), without storing, for example, the measured impedance value in the measurement memory 152.

The scavenging controller (execution means) 160 performs scavenging control in accordance with the content of the notice from the impedance comparator 150. Specifically speaking, if the scavenging controller 160 is notified by the impedance comparator 150 that the measured impedance value is lower than the impedance reference value, the scavenging controller 160 executes the scavenging processing. On the other hand, if the scavenging controller 160 is notified by the impedance comparator 150 that the measured impedance value is higher than the impedance reference value, the scavenging controller 160 stops the scavenging processing. This scavenging processing is realized by adjusting, for example, the supply amount of the oxidant gas to be supplied to the fuel cell 40 and the valve opening of a bypass valve (not shown in the drawing). The scavenging control processing according to this embodiment will be explained below.

Explanation of Operation

Figure 3:
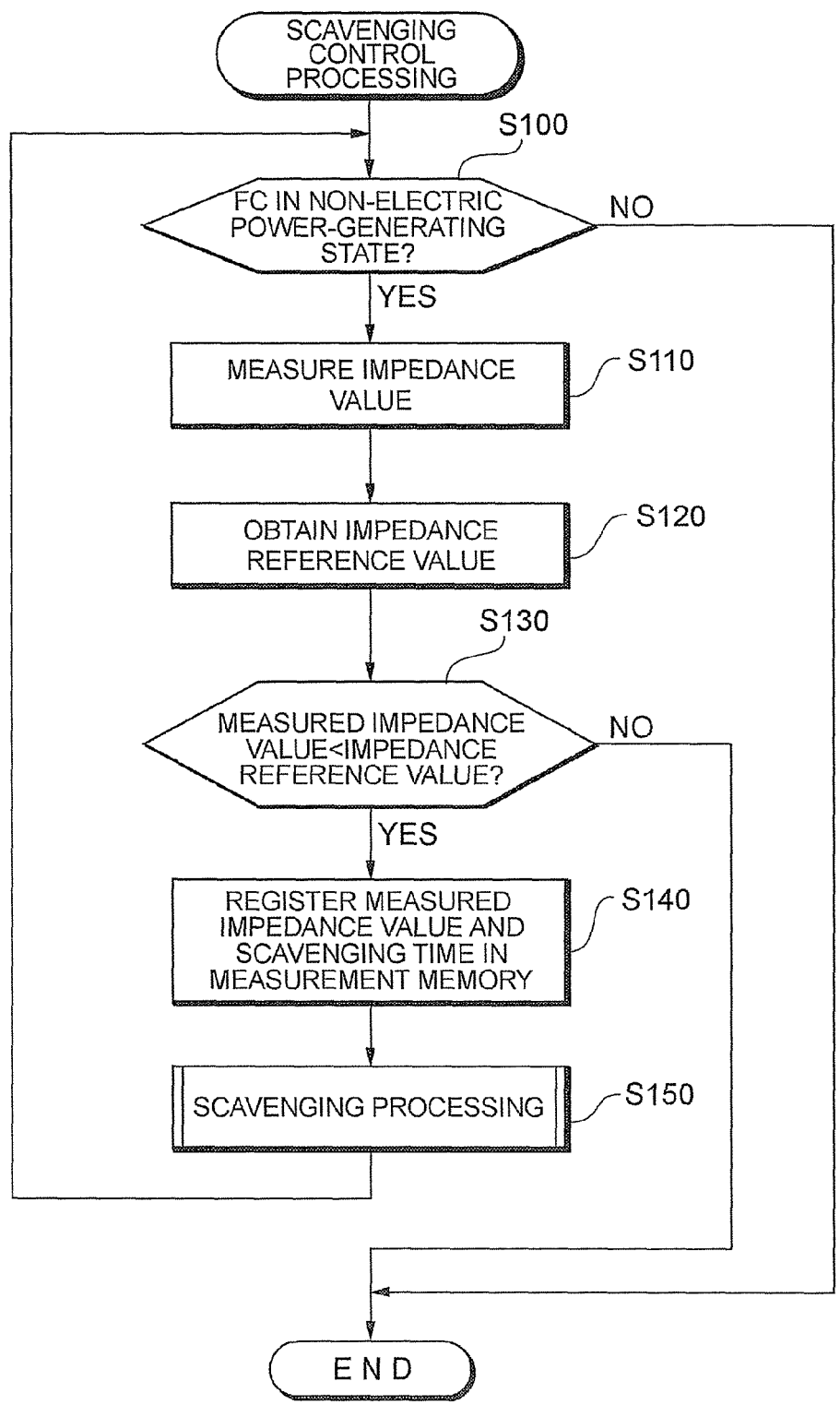
FIG. 3 is a flowchart illustrating scavenging control processing according to the first embodiment.

FIG. 3 is a flowchart illustrating the scavenging control processing executed intermittently by the control unit 10.

The status detector 105 detects, based on, for example, the FC voltage Vf and the FC current If, whether the fuel cell 40 is in an electric-power-generating state or in a non-electric-power-generating state (step S100). If the status detector 105 detects that the fuel cell 40 is in an electric-power-generating state, it terminates the scavenging control processing without executing the following steps. On the other hand, if the status detector 105 detects that the fuel cell 40 is in a non-electric-power-generating state because, for example, an ignition key is turned off, the status detector 105 notifies the target voltage determiner 110 and the superimposed signal generator 120 that the impedance measurement should be started.

After being notified by the status detector 105 that impedance measurement should be started, the target voltage determiner 110 determines an output target voltage based on sensor signals input from, for example, the accelerator pedal 11 and the SOC sensor 21, and then outputs the output target voltage to the voltage command signal generator 130. On the other hand, after the superimposed signal generator 120 is notified by the status detector 105 that the impedance measurement should be started, the superimposed signal generator 120 generates an impedance measurement signal to be superimposed on the output target voltage and then outputs the impedance measurement signal to the voltage command signal generator 130. The voltage command signal generator 130 superimposes the impedance measurement signal on the output target voltage and then outputs the obtained voltage command signal Vfcr to the DC/DC converter 30. The DC/DC converter 30 controls the voltage of, for example, the fuel cell 40 based on the supplied voltage command signal Vfcr.

The impedance operation unit 140 measures an impedance value in a non-electric-power-generating state based on the FC voltage Vf detected by the voltage sensor 141 and the FC current If detected by the current sensor 142 and then supplies the measured impedance value to the impedance comparator 150 (step S110).

After receiving the measured impedance value from the impedance operation unit 140 the impedance comparator 150 obtains an impedance reference value corresponding to the FC temperature T from among a plurality of impedance reference values stored in the memory 151 (step S120). Subsequently, the impedance comparator 150 compares the measured impedance value received from the impedance operation unit 140 with the impedance reference value corresponding to the FC temperature T (step S130).

If the impedance comparator 150 determines that the measured impedance value is higher than the impedance reference value, it notifies the scavenging controller 160 that the scavenging processing should be terminated (or should not be executed from the beginning). On the other hand, if the impedance comparator 150 determines that the measured impedance value is lower than the impedance reference value, the impedance comparator 150 registers the measured impedance value and elapsed time after the start of the scavenging processing (scavenging time) in the measurement memory 152 (step S140) and then notifies the scavenging controller 160 that the scavenging processing should continue (or should be started).

Figure 4:
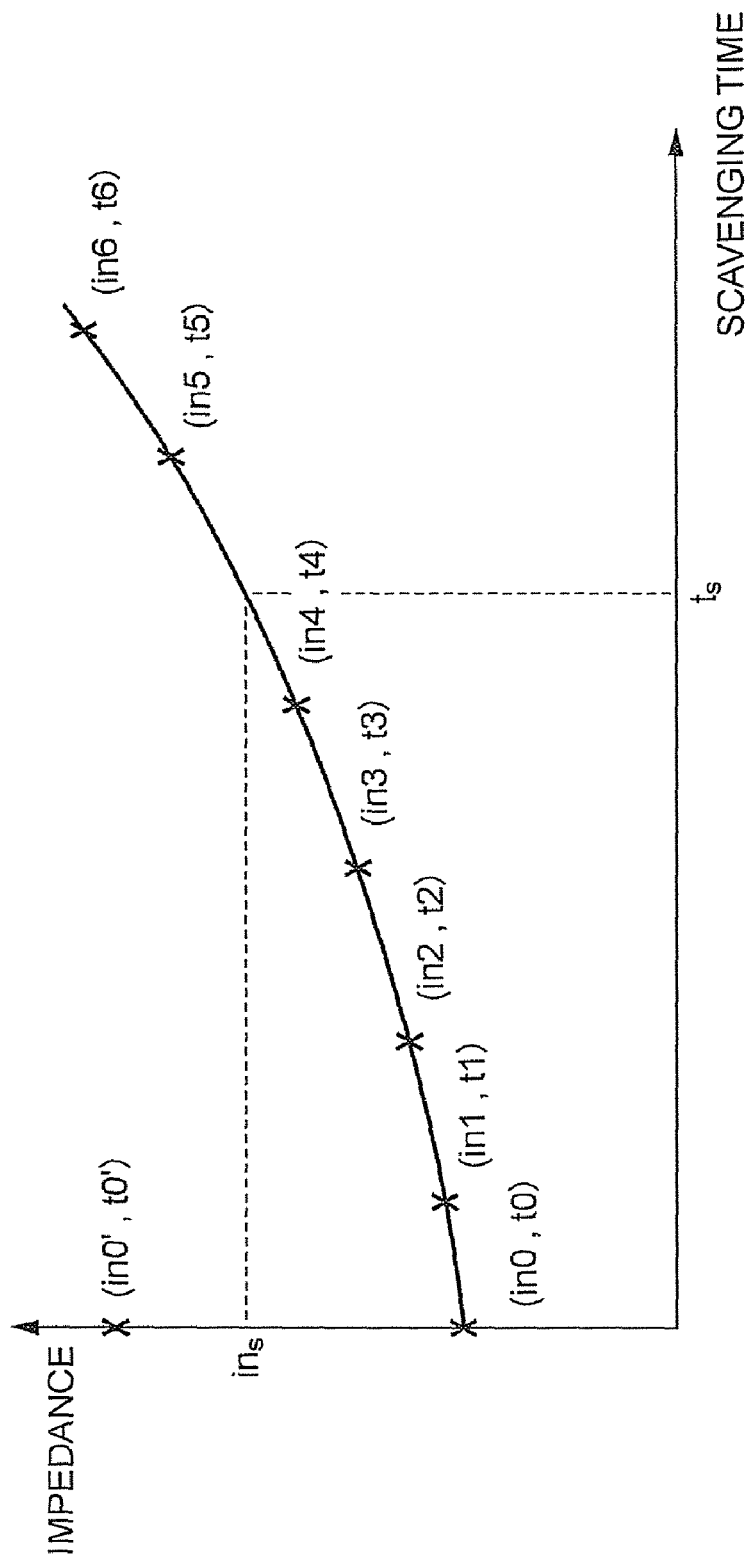
FIG. 4 shows the relationship between scavenging time and a measured impedance value according to the first embodiment.

FIG. 4 is a diagram showing the relationship between the scavenging time and the measured impedance value.

As shown in FIG. 4, the longer the scavenging time becomes, the drier the electrolyte membrane becomes and the higher the measured impedance value becomes. While the measured impedance value is lower than the impedance reference value ins, the impedance comparator 150 registers pairs of the measured impedance value and the scavenging time ((in, t)=(in 0, t0), (in1, t1), and so on until (in4, t4)) in the measurement memory 152. Incidentally, the expression (in 0, t0) shown in FIG. 4 represents the measured impedance value immediately before the start of the scavenging processing and the scavenging time.

Subsequently, if the measured impedance value becomes higher than the impedance reference value ins, the impedance comparator 150 terminates the scavenging control processing without registering the pairs of the measured impedance value and the scavenging time ((in, t)=(in5, t5), (in6, t6), etc.) in the measurement memory 152. Incidentally, the measured impedance value may be already higher than the impedance reference value ins before the start of the scavenging processing (for example, as shown with (in0', t0') in FIG. 4). In this case, the processing will be terminated without starting the scavenging processing. As a result, it is possible to prevent the adverse effect caused by unnecessary execution of the scavenging processing, that is, the problem of excessive drying of the electrolyte membrane making it more difficult to activate the fuel cell system due to the unnecessary execution of the scavenging processing.

After being notified by the impedance comparator 150 that the scavenging processing should be terminated (or should not be executed to start with), the scavenging controller 160 terminates the scavenging control processing described above. On the other hand, after the scavenging controller 160 is notified by the impedance comparator 150 that the scavenging processing should continue (or should be started), the scavenging controller 160 executes the scavenging processing by adjusting, for example, the supply amount of the oxidant gas to be supplied to the fuel cell 40 and the valve opening of the bypass valve (step S150), and then returns to step S100. Incidentally, operations after returning to step S100 can be explained in the same manner as described above, so accordingly, any further explanation has been omitted.

According to this embodiment described above, the scavenging processing is executed only when the measured impedance value is lower than the impedance reference value. As a result, it is possible to prevent the adverse effect caused by unnecessary execution of the scavenging processing, that is, the problem of, for example, excessive drying of the electrolyte membrane making it more difficult to activate the fuel cell system due to the unnecessary execution of the scavenging processing.

Regarding the first embodiment described above, no particular reference has been made to the scavenging amount per unit time in the above explanation, but the scavenging amount may be either constant or variable. In order to keep the scavenging amount per unit time constant, for example, it is only necessary to keep the supply amount of the oxidant gas and the valve opening of the bypass valve constant while executing the scavenging processing. On the other hand, the scavenging amount per unit time may be made variable by finding a difference between the measured impedance value and the impedance reference value and determining, for example, the supply amount for the oxidant gas and the valve opening of the bypass valve from the above-obtained difference. If the obtained difference is larger than a set threshold value, the fuel cell system is controlled to increase the impedance value much sooner by setting, for example, a large supply amount of the oxidant gas. In this way, the scavenging processing can be terminated more quickly by making the scavenging amount per unit time variable.

The first embodiment used the oxidant gas as an example of gas to be supplied to the fuel cell during the scavenging processing. However, this embodiment can use any type of gas for which the impedance value can be measured, such as fuel gas (for example, hydrogen) or nitrogen gas.

B. Second Embodiment

According to the aforementioned first embodiment, the impedance value of the fuel cell is measured intermittently and the scavenging processing is executed until the measured impedance value becomes higher than the impedance reference value. However, time required for the measured impedance value to reach the impedance reference value may be estimated and the scavenging processing may be controlled based on the estimated time (hereinafter referred to as the "estimated arrival time").

Figure 5:
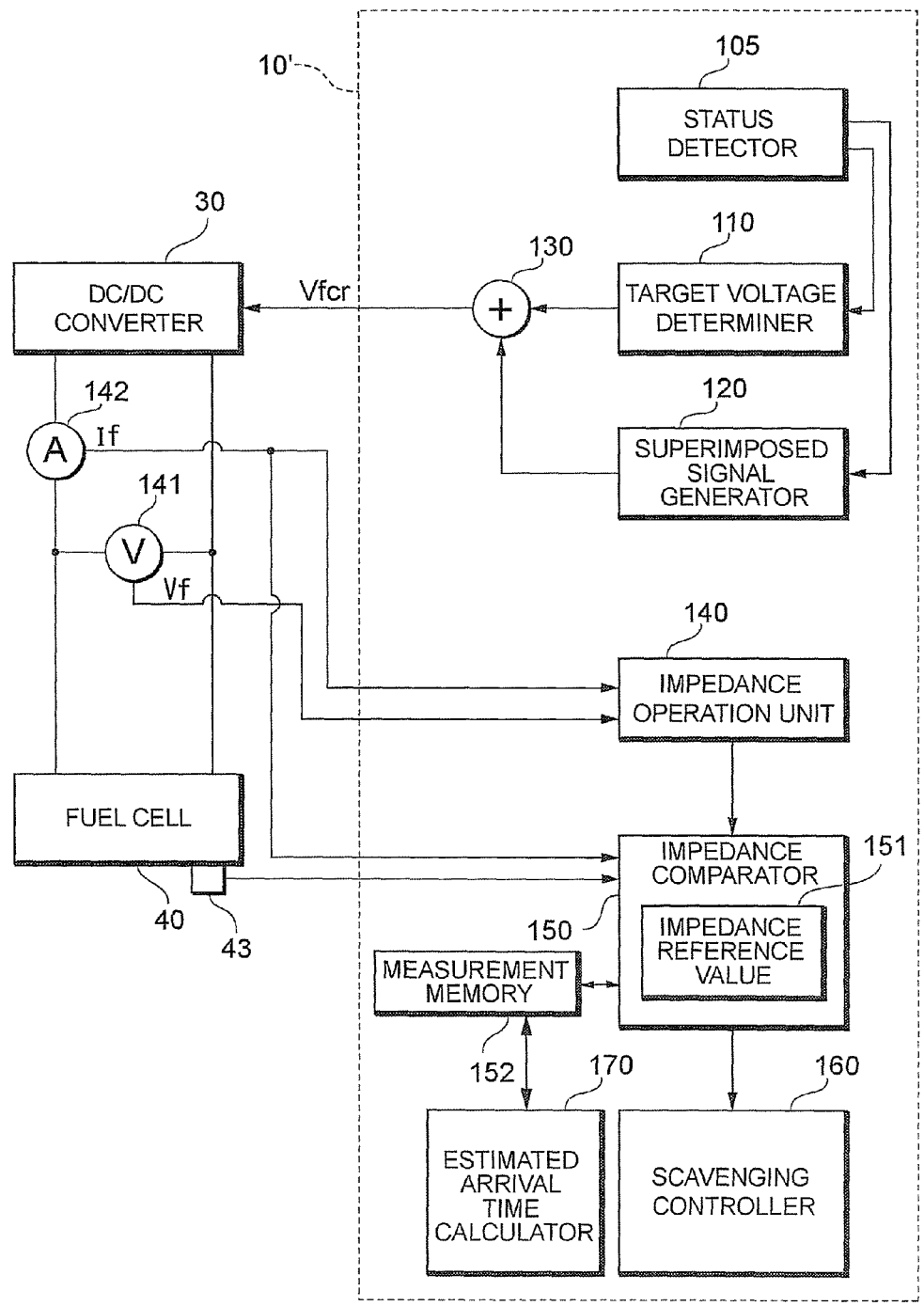
FIG. 5 is a diagram for explaining the function of a control unit according to the second embodiment.

FIG. 5 is a diagram for explaining a scavenging control function of a control unit 10' according to the second embodiment and corresponds to FIG. 2. Elements corresponding to those in FIG. 2 are given the same reference numerals as those in FIG. 2, so any detailed explanation thereof has been omitted.

An estimated arrival time calculator (calculation means) 170 calculates the estimated arrival time based on the pairs of the measured impedance value and the scavenging time (for example, (in, t)=(in 0, t0), (in1, t1), and so on until (in4, t4) as shown in FIG. 4) registered in the measurement memory 152. If (in0, t0) and (in1, t1) shown in FIG. 4 are registered in the measurement memory 152, the time required to reach the impedance reference value ins (i.e., the estimated arrival time) ts is calculated by executing secondary interpolation processing based on (in0, t0), (in1, t1), and the impedance reference value ins. As a result, adequate scavenging control can be realized while decreasing the number of times the impedance value is measured. Incidentally, the number of times n the impedance value is measured (n≧2) can be set as appropriate.

C. Third Embodiment

According to the aforementioned second embodiment, the estimated arrival time ts is calculated without particularly limiting the number of times the impedance value is measured. However, once a command to stop the system is input, the supply of the fuel gas to the fuel cell 40 will be stopped and the use of the fuel gas necessary for the impedance measurement will be limited. Therefore, the third embodiment makes it possible to obtain the estimated arrival time ts with high accuracy so that the water content in the fuel cell 40 will be controlled, with the limited number of times the impedance value is measured (twice or less), to be a target water content.

Figure 6:
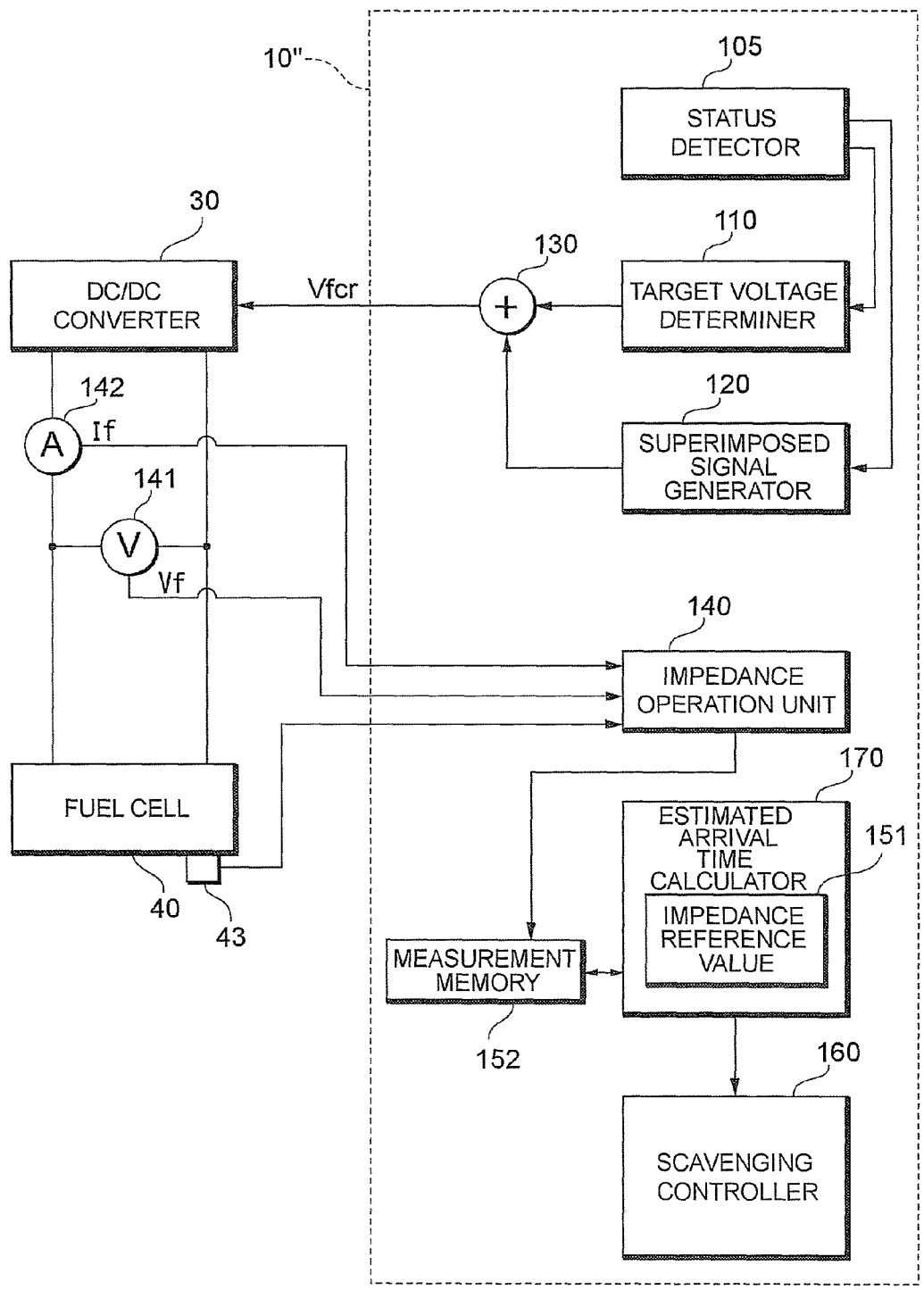
FIG. 6 is a diagram for explaining the function of a control unit according to the third embodiment.
Figure 7:
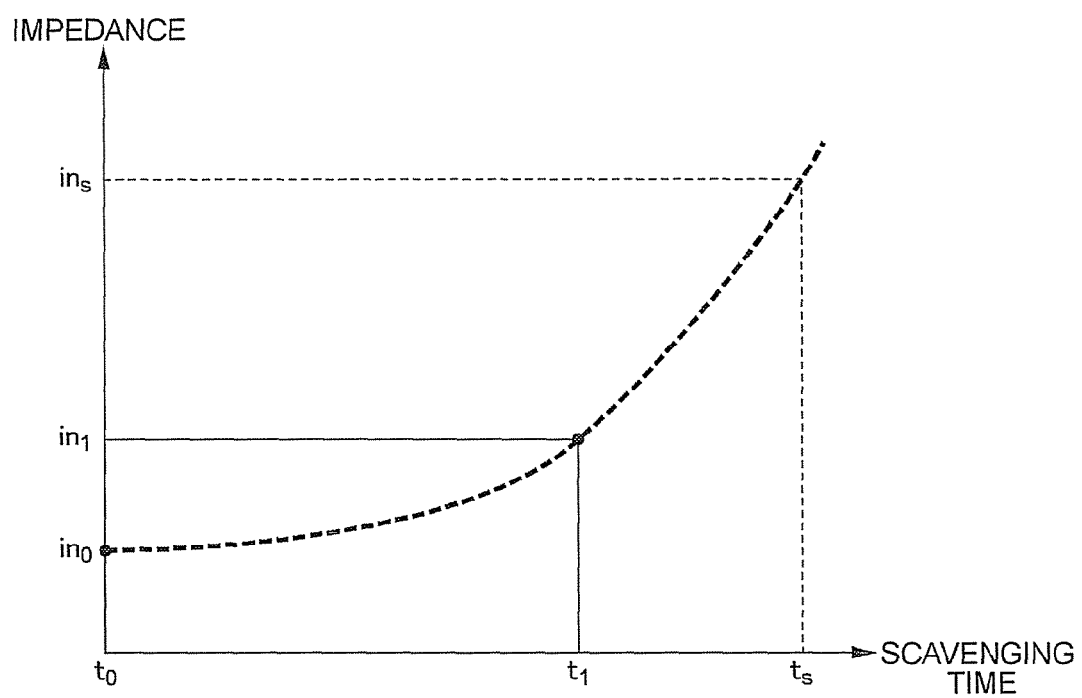
FIG. 7 shows the relationship between scavenging time and a measured impedance value according to the third embodiment.

FIG. 6 is a diagram for explaining a scavenging control function of a control unit 10" according to the third embodiment and corresponds to FIG. 5. FIG. 7 shows the relationship between the scavenging time and the measured impedance value and corresponds to FIG. 4. Incidentally, regarding the configuration shown in FIG. 6, elements corresponding to those in FIG. 5 are given the same reference numerals as those in FIG. 5 and any detailed explanation thereof has been omitted.

After a command to stop the system is input, the impedance operation unit (measurement means) 140 performs the first impedance measurement and a pair of an impedance value immediately before the start of the scavenging processing (the first measured impedance value) and the scavenging time ((in, t)=(in0, t0) shown in FIG. 7) is stored in the measurement memory (storage means) 152. Meanwhile, when triggered by the input of the command to stop the system, the scavenging controller 160 starts the scavenging processing. Subsequently, the impedance operation unit 140 judges if a specified time (for example, 30 seconds) has elapsed since the start of the scavenging processing, using a timer 141 or the like. If the impedance operation unit 140 determines that a specified time has elapsed, it performs the second impedance measurement and stores a pair of an impedance value during the scavenging processing (the second measured impedance value) and the scavenging time ((in, t)=(in1, t1) shown in FIG. 7) in the measurement memory 152.

From the viewpoint of improving the estimation accuracy of the scavenging completion time, it is desirable that the second impedance measurement should be performed when the water content in the fuel cell 40 decreases as much as possible. Based on this point of view, the second impedance measurement may be performed when a temperature change speed of the fuel cell 40 is detected and the detected temperature change speed exceeds a set threshold value. Incidentally, the threshold value may be set in consideration of the progress of vaporization of residual water in the fuel cell 40.

The estimated arrival time calculator (estimation means) 170 is a means for calculating the estimated arrival time (scavenging completion time) based on the pairs of the measured impedance value and the scavenging time registered in the measurement memory 152. The memory (memory means) 151 stores the impedance reference value (scavenging completion target impedance value) ins. The estimated arrival time calculator 170 calculates the estimated arrival time is by inputting the first measured impedance value in0, the second measured impedance value in1, the impedance reference value ins, and the scavenging time t1 for the first measured impedance value to the following formula (1), and then outputs the calculation result to the scavenging controller 160.

$$ts = \sqrt{\frac{ins - in0}{in1 - in0}} \, t1 \quad (1)$$

The scavenging controller 160 executes the scavenging processing according to the estimated arrival time output from the estimated arrival time calculator 170. As a result, adequate scavenging control can be realized while decreasing the number of times the impedance value is measured.

According to the above-described embodiment, the first impedance measurement is performed immediately before the start of the scavenging processing (around the time of the start of the scavenging processing) after the command to stop the system was input. However, the first impedance measurement may be performed immediately after the start of the scavenging processing (around the time of the start of the scavenging processing). Furthermore, the impedance value measured immediately before the input of the command to stop the system may be used as the first measured impedance value.

Regarding the above-described embodiment, no particular reference is made to the impedance reference value set in the memory 151. However, for example, the estimated arrival time calculator (change means) 170 may change the impedance reference value as necessary based on the FC temperature T detected by the temperature sensor 43 and date and time information specified by a calendar mechanism (not shown in the drawing) contained in the system.

Furthermore, the impedance reference value may be changed as necessary depending on new information obtained as described below. If the impedance value is measured after the estimated arrival time has actually elapsed, the measured impedance value may sometimes deviate from the target range for the impedance reference value (for example, ins±α). Therefore, an impedance value measured when the system is started may be stored in, for example, the memory, the latest start-up impedance value measured at that time is compared with another start-up impedance value measured in the past, and the impedance reference value may be changed according to the result of that comparison. Specifically speaking, if the difference between the start-up impedance value measured in the past and the latest start-up impedance value measured at that time is within the specified range, the impedance reference value will not be changed; and if the difference is beyond the specified range, the impedance reference value will be changed. As a matter of course, the comparison target is not limited to the start-up impedance value, and any parameter such as current-voltage characteristic at the time of start-up may be used as the comparison target.

Furthermore, a time change in the measured impedance value is assumed as a quadratic function ($y=at^2+in0$) in the above-described embodiment, but any arbitrary function such as an exponential function can be used.

The invention claimed is:

1. A fuel cell system for measuring an impedance value of a fuel cell and performing scavenging processing based on the measurement result while the system is stopped, the fuel cell system comprising:
    a fuel cell;
    a measurement device that measures more than once the impedance value of the fuel cell and a corresponding elapsed time after the start of the scavenging processing;
    a storage device that stores a plurality of pairs of the measured impedance value and the corresponding elapsed time;
    a memory device that stores an impedance reference value; and
    an estimation device programmed to estimate a scavenging completion time based on the impedance reference value and the pairs of the measured impedance value and the corresponding elapsed time.

2. The fuel cell system according to claim 1, wherein the measurement device performs the measurement twice, the first measurement around the time of the start of the scavenging processing and the second measurement after specified time has elapsed from the start of the scavenging processing.

3. The fuel cell system according to claim 1, further comprising:
    a temperature sensor that detects a temperature relating to the fuel cell; and
    a change device that changes the impedance reference value based on the detected temperature.

4. The fuel cell system according to claim 1, further comprising:
    a calendar mechanism that detects a date and time; and
    a change device that changes the impedance reference value based on the detected date and time.

* * * * *

UNITED STATES PATENT AND TRADEMARK OFFICE
CERTIFICATE OF CORRECTION

PATENT NO. : 8,221,925 B2
APPLICATION NO. : 12/521523
DATED : July 17, 2012
INVENTOR(S) : Tomonori Imamura et al.

It is certified that error appears in the above-identified patent and that said Letters Patent is hereby corrected as shown below:

| Column | Line | |
|---|---|---|
| 9 | 5 | Change "arrival time is" to --arrival time ts--. |

Signed and Sealed this
Eighth Day of January, 2013

David J. Kappos
*Director of the United States Patent and Trademark Office*